united States Patent Office 3,216,449
Patented Nov. 9, 1965

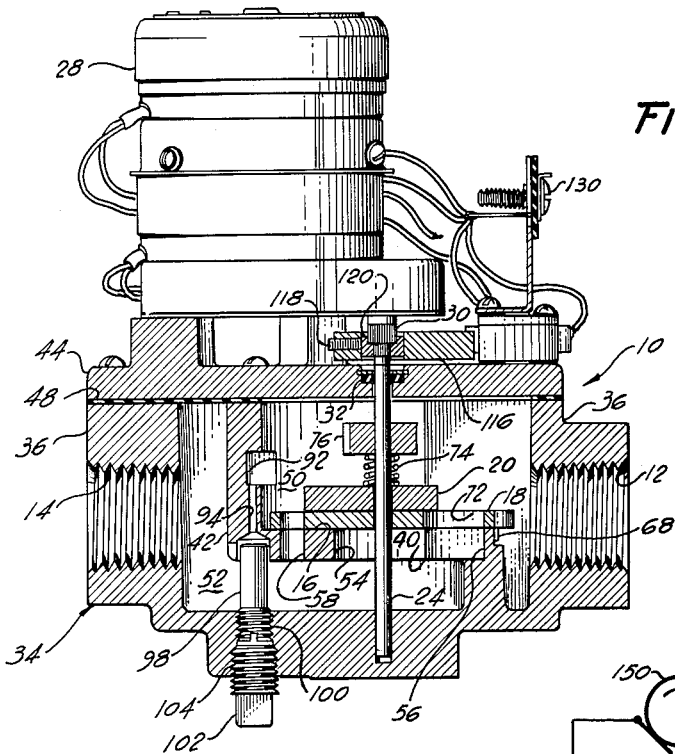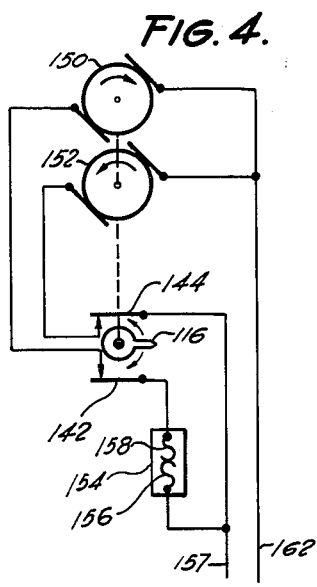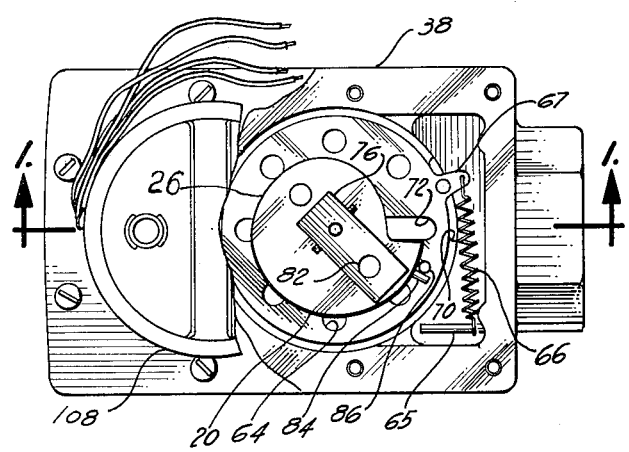

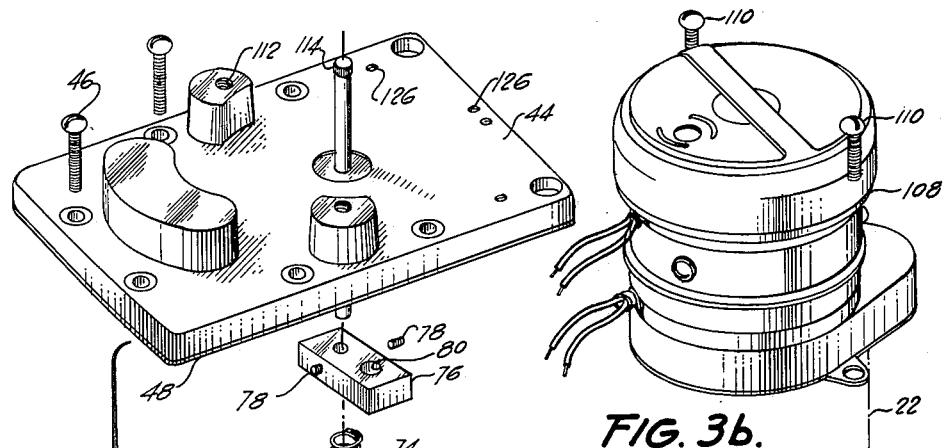
FIG. 3b.
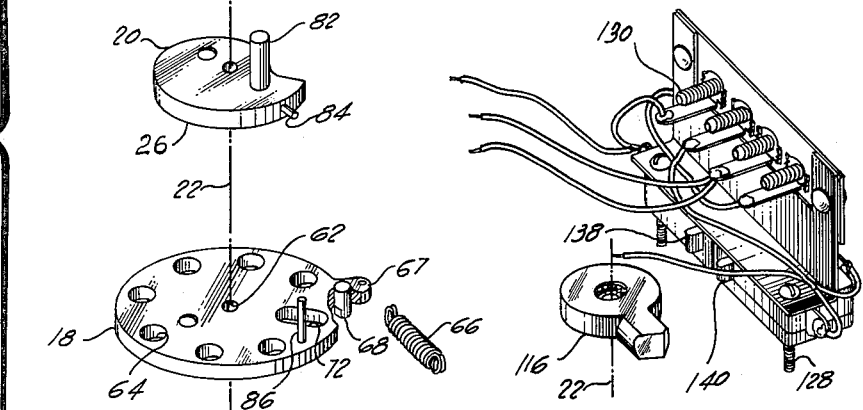
FIG. 3c.
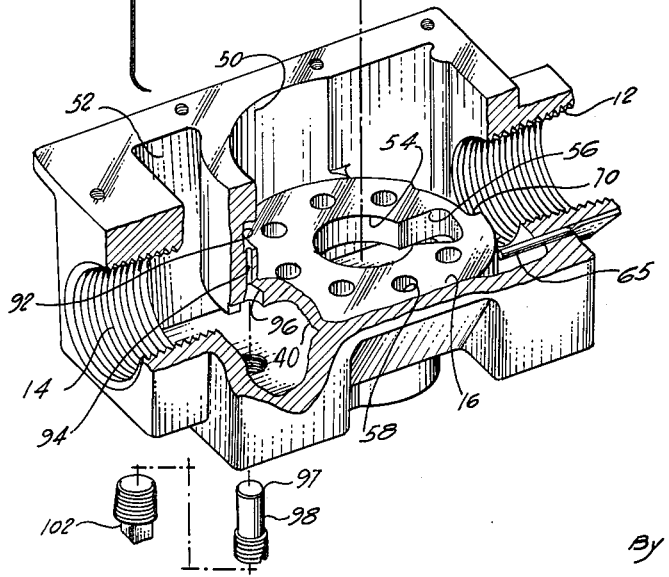
INVENTORS
Wendell E. Maudlin.
John L. Vanausdall.
By A. G. Douvas
Attorney.

3,216,449
MODULATING INPUT CONTROL FOR A GAS APPLIANCE
Wendell E. Maudlin and John L. Vanausdall, Lebanon, Ind., assignors to Stewart-Warner Corporation, Chicago, Ill., a corporation of Virginia
Filed Aug. 24, 1962, Ser. No. 219,181
16 Claims. (Cl. 137—599)

This invention relates to a modulating control, and in particular, to a gas valve operable to modulate the inlet volume of gas fuel to a gas appliance.

Automatic control systems can be divided basically into two separate groups: those having two position settings, such as on and off; and those having multiple position settings of varying values between the on and off. The distinction between the groups is the position of the control element in its various operative settings.

For example, a conventional gas heating system includes a gas pressure regulator, a burner, an on-off gas valve, proper heat limit switches, and a thermostat for automatically sensing and responding to the ambient temperature of the controlled enclosure. In a gas heating system, the quantity of gas delivered to the burner determines the heat output. The maximum heat output of any system should be sufficient to overcome the enclosure heat losses to ensure ambient comfort in the coldest anticipated weather conditions. At moderate heat demands, the quantity of gas input must be reduced to less than maximum comparable to the decreased heat losses to maintain the ambient temperature generally constant. A control system of fixed maximum capacity is regulated in an on-off manner to vary the heat output. A modulating control varies the gas input gradually or in incremental changes.

Intermittent burner operation is generally less efficient than modulation since the shut-off time allows cooling of the entire assembly, requiring a reheat back to the operating temperature. The resulting flue losses, though possibly of small magnitude separately, are substantial when repeated over the many cycles of an on-off control. Also, intermittent blower operation causes a noise comfort factor. Since a low continuous background noise is believed less disagreeable than intermittent noise and silence, the abrupt change of noise level causes psychological displeasure. Similarly, stratification of the room air more readily occurs during intermittent blower operation. Thus, not only is there a greater temperature variation from floor to ceiling, but the sensitivity of the thermostat is reduced.

Overdrive and underdrive of the thermostatic control in the on-off control causes variations of 4 to 5 degrees, whereas 1/10 of a degree maximum variation is possible with a modulating control. To minimize the overdrive and underdrive, most existing thermostats have heat anticipation controls including an auxiliary heater. Generally, the auxiliary heater operates with the burner on a heat demand to cause the local temperature sensed by the thermostat to be slightly higher than the actual ambient temperature. This sensed higher temperature than ambient anticipates the room ambient temperature prematurely to eliminate overshoots. However, since the on-off control system is intermittently operated with at most a longer on period than off period, with a rapid drop in outdoor temperature the total heat added is insufficient. Thus the ambient room temperature becomes increasingly less than the thermostat setting resulting in a droop characteristic.

Accordingly, a basic object of this invention is to provide a modulating control of low cost for accurately regulating the gas input to a gas appliance.

Another object of this invention is to provide a modulating control gas valve which is an addition to components of a conventional on-off system rather than a substitution thereof, so that the subject valve can be readily incorporated in such existing systems.

Another object of this invention is to provide a low cost single item modulating control gas valve which is of simple construction and which operates with conventional control apparatus of low cost and high dependability without the necessity of electronic components or relays.

Another object of this invention is to provide a modulating control gas valve which can vary gas flows in any predetermined manner between its extreme capacities, and in which valve setting, when determined, will not be changed by variations in gas pressures or flows through the valve.

Another object of this invention is to provide a modulating control gas valve which can be used with little or no modifications for a wide variation of flow outputs, making possible a single valve construction of sufficient variation to handle, for example, a standard 80,000 B.t.u. per hour furnace and/or a 160,000 B.t.u. per hour furnace.

In order that these and other objects and advantages can be more fully appreciated reference is herein made to the accompanying drawings, wherein:

FIG. 1 is an elevational view, partly in longitudinal center cross-section as seen from line 1—1 of FIG. 2, of the subject modulating gas valve;

FIG. 2 is a top plan view of the valve of FIG. 1, with a portion of the valve cover being removed to show the valve plate and cam member;

FIG. 3a is an exploded perspective view of the valve body and components of the subject modulating valve;

FIG. 3b is a perspective view of the opening and closing reversing motor used in the subject modulating gas valve, and showing by the centerline its assembled position relative to FIG. 3a;

FIG. 3c is a perspective view of the electrical terminal block, limit switches, and a limit switch actuating member used in the subject modulating valve, and showing by the centerline their assembled positions relative to FIGS. 3a and 3b; and FIG. 4 is a typical electric schematic diagram of the subject modulating gas control.

Referring now to the drawings, FIGS. 1 and 2 show the subject modulating valve includes a hollow gas-tight valve body 10 having threaded inlet and outlet openings 12 and 14, respectively. The valve body 10 defines between the inlet 12 and outlet 14 an internal through-passageway or flow path for the gaseous fuel. A valve seat 16 formed across the flow passageway has a number of through-openings therein which define for the most part the maximum cross-sectional area of the passageway. A valve plate 18 seated on the valve seat 16 also has a plurality of through-openings which in the operative positions of the valve plate 18 are aligned in various degrees with the valve seat openings. Cam member 20 positioned on the valve plate 18 has a cam contour 26 that passes over at least one of the aligned through-openings in the valve seat and valve plate. The valve plate 18 and cam member 20 are designed to rotate about the axis 22 (FIGS. 3a, b and c) defined as the center axis of shaft 24.

The cam member 20 and the valve plate 18 are actuated by rotation of the shaft 24 by a reversing motor 28 interconnected through a gear train and pinion 30 to the shaft 24. O-ring sealing gasket 32 around the shaft 24 seals the valve body to avoid exterior leakage. Rotation of the shaft 24 causes the conductor 26 of the cam 20 to traverse the various through-openings of the valve plate and valve seat, and the alignment of the through-openings to change, to vary thereby the effective cross-section of the flow passageway between the inlet 12 and outlet 14. The reversing motor 28 responds to a thermostatic control signal to modulate the effective gas flow opening as required. The actual instantaneous gas flow through the valve body from the inlet 12 to the outlet 14 can be varied between the maximum and the minimum, as can the specific rate of change of gas flow with respect to shaft rotation.

Referring now more to the specific construction of the subject modulating valve, the valve body 10 is formed from a casting 34 including opposing end walls 36 in which the inlet opening 12 and outlet opening 14 are presented, opposing side walls 38, a bottom wall 40, and an intermediate transverse wall 42 interconnecting the side walls 38 and the bottom wall 40. The casting 34 is closed at its open top end by a removable cover plate 44 which is secured to the casting by appropriate bolts 46. A gasket 48 interposed between the cover plate 44 and the upper surface of the casting 34 forms a gas-tight assembly. The various wall structures 36, 38, 40 and 42, and the cover plate 44 forms separate chambers 50 and 52 on opposite sides of the intermediate wall 42, upon which the previously-mentioned valve seat 16 is formed. The chambers 50 and 52 communicate, respectively, directly with the inlet opening 12 and the outlet opening 14.

The valve seat 16 and valve plate 18 have defined therein a plurality of variously sized and spaced through-openings adapted to intercommunicate chambers 50 and 52 and form an internal flow path between the inlet 12 and the outlet 14. The valve seat 16 includes key hole shaped opening 54 having widened slot 56 as the extended portion thereof. Circumferentially and radially spaced openings 58 are disposed about the central portion of the opening 54. The valve plate 18 seats on the valve seat 16 and is positioned laterally thereon by means of the shaft 24 extending snugly through central opening 62. The valve plate 18 has openings 64 spaced and sized to correspond generally to the openings 58 in the valve seat 16. Tension spring 66 between pin 65 on the valve body 10 and lug 67 on the valve plate biases the valve plate about the shaft 24 in a clockwise direction as seen in FIG. 2. Downwardly projecting pin 68 on the valve plate 18 strikes the intermediate wall 42 at stop 70, shown in FIG. 2, to limit clockwise rotation. In the furthest clockwise position of the valve plate 18 on the valve seat 16, the previously-mentioned openings 58 and 64 are in closed non-aligned relationship. The valve plate 18 further includes a slot 72 of narrower width than the enlarged slot portion 56 of opening 54. The slot 72 is positioned relative to the pin 68, the slot 56 and the stop 70 to communicate with the slot 56 in the furthest clockwise position. Thus, though openings 58 and 64 are closed in the furthest clockwise position of the valve plate, the slots 56 and 72 define a through-passage between the chambers 50 and 52, and thus between the inlet 12 and outlet 14.

The cam members 20 on valve 18, and the valve plate on the valve seat 16 are maintained snug and seated by compression spring 74 extending between a cam actuating plate 76 and the cam member. The cam actuating plate 76 is keyed to shaft 24 by aligned set screws 78 and presents an opening 80 spaced radially from the positioned shaft 24 adapted to receive cylindrical pin 82 projecting upwardly from the cam member. Thus rotation of shaft 24 causes the cam actuating plate 76 to rotate, which in turn through pin 82, causes the cam member to rotate. Upon rotation, contour 26 of the cam member varies the effective opening between the chambers 50 and 52 as defined by the aligned slots 56 and 72. Thus in one extreme position of the cam member on the valve plate (clockwise in FIGS. 2 and 3a), most of the defined continuous through-opening is closed or is blocked off between the chambers 50 and 52 by the cam contour, whereas counter-clockwise rotation of the cam 20 progressively increases the area of opening through the slots 56 and 72 to accommodate greater gas flow through the valve.

The cam member 20 has a laterally projecting pin 84 which strikes an upwardly projecting pin 86 on the valve plate 18 when the cam member 20 has rotated counter-clockwise to the position where the contour 26 is fully opened relative to the aligned slots 56 and 72 (FIG. 2). Continued counter-clockwise rotation of the shaft 24 thereby no longer rotates the cam member 20 relative to the valve plate 18, but rotates the valve plate 18 relative to the valve seat 16. The previously-mentioned openings 58 and 64, which are not aligned in the normal spring-biased position of the valve plate on the valve seat, thereby gradually become aligned to intercommunicate the chambers 50 and 52. Even upon rotation of the valve plate 18, since slot 56 is wider than slot 72, the slots 56 and 72 remain aligned so that the slot 72 determines at all times the maximum opening regulated by the cam. The increased number and corresponding areas of the through-openings greatly increase the flow capacity of the valve to satisfy substantially any varying number of gas flow requirements. It is noted that only a few degrees of rotation of the shaft 24 and the valve plate 18 relative to valve seat 16 is required to completely align and fully open the openings 56 and 64.

In addition to the defined flow paths through the aligned slots 56 and 72 past contour 26 of the cam member, and through the alignable opening 58 and 64, there is also provided a fine adjustment by-pass for accurate low output settings. Thus, in FIGS. 1 and 3a the intermediate wall 42 exposed to chamber 50 is cut out at 92 to intersect a bore 94 in the wall. The bore 94 is countersunk at 96 adapted to be engaged by a complementary fitting bevelled seat 97 on adjustable valve plug 98 threaded into a threaded opening 100 in the bottom wall 40. Adjustment of the valve plug 98 toward and away from seat 96 as required varies the by-pass through-opening between the chambers 50 and 52. A second plug 102 in an enlarged threaded opening 104 aligned with threaded opening 100 protects the adjusted setting of the plug 98 from accidental change while it further seals the valve body. It can readily be appreciated that because of the complementary bevelled seats 96 and 97 a fine adjustment can be established and maintained for any particular small flow setting of the valve.

The shaft 24 is actuated by the reversing drive motor 28, as was previously-mentioned, through the interaction of a gear train (not shown). The motor 28 includes a housing 108 secured to the valve body by bolts 110 received in threaded openings on posts 112 on the top side of the cover plate 44. A cam drive member 116 is keyed to the knurled projecting end 114 of shaft 24 by means of a drive insert 120 held by set screw 118 to the cam member. The drive insert 120 has a toothed opening adapted to receive in driving engagement the pinion 30 from reversing motor 28. Thus rotation of the motor 28 is conveyed through the pinion 30, the drive insert 120 and the cam drive member 116, to the shaft 24 to drive the cam actuating plate 76 and the cam member 20 and/or appropriately the valve plate 18.

A terminal strip for the various electrical connections is secured to the valve cover plate 44 at the tapped openings 126 by means of threaded bolts 128. The terminal strip has connected thereto leads to the drive motor 28 and is provided with quick terminal connection means such as the screw members 130 for in-the-field wiring. The terminal strip 124 houses therein two normally closed on-off limit switches which are used to stop the rotation of the shaft 24 and the appropriate interconnected structure when driven to the extreme operative positions. Thus in FIGS. 3a, 3b and 3c as related by the common axis 22 of shaft 24, the cam drive member 116 being secured to the upper projecting end of the shaft 24 rotates with the shaft through the appropriate angle until at each limiting position it contacts and actuates the limit switch buttons 138 and 140 for the limit switches. Clockwise rotation of the cam member 20 and the valve plate 18 causes the modulating valve to approach its minimum flow setting as limited by the cam drive member 116 striking the valve closing limit switch button 138. At the minimum valve setting the valve plate 18 is in the position where pin 68 directly contacts stop 70 on the valve body and the cam member 20 is rotated with the contour 26 for the most part covering the aligned slots 58 and 72. Counter-clockwise rotation of the shaft 24 progressively retreats the cam contour 26 from the aligned slots 72 and 58 to increase progressively the flow path opening for correspondingly increased gas inputs. Throughout counter-clockwise shaft rotation of approximately 300° the cam rotates on the valve plate, the valve plate being stationary on the valve seat. As previously-mentioned pin 84 then strikes pin 86 to cause continued counter-clockwise shaft rotation to rotate the valve plate relative to the valve seat, which is through approximately an angle of 30°. The counter-clockwise rotation of the shaft 24 is limited by the cam drive member 116 striking and actuating the valve opening limit switch button 140.

The subject modulating valve operates in combination with a conventional two-contact open-close thermostat and conventional gas pressure regulating apparatus to modulate the quantity of inlet gas supplied to the burner. The modulated quantity of fuel in turn directly determines the heat output of the burner to more correctly correspond to the actual heat loss of the heat controlled enclosure. Thus, for example and ignoring secondary heat gains, to maintain an enclosure at a desired ambient temperature of 75° F. while having a uniform heat loss of 50,000 B.t.u. per hour, the ideal heat input is a uniform input of 50,000 B.t.u. per hour. In a modulating gas valve the valve setting will approach the position corresponding to a uniform output rate of 50,000 B.t.u. per hour and modulate slightly above and below that rate to average out to the exact requirement. Since the variation from the exact requirement is only a few percent, the overshoot and undershoot of the temperature from the desired set temperature is small or negligible. This improves both comfort and fuel economy.

In operation, the modulating gas valve is driven to various flow positions by means of the reversing motor 28. The reversing motor 28 in the embodiment herein disclosed includes two synchronous motors of low wattage which are mechanically connected and which tend to oppose one another. In the subject design, the opening motor 150 is of larger power output than the closing motor 152. Thus, when both motors are connected electrically and operating, the opening motor 150 overpowers the closing motor 152 to drive the shaft 24 in the opening counter-clockwise direction as seen in FIGS. 2 and 3a. A thermostat 154 of conventional construction such as a tiltable mercury-type having contacts 156 and 158 which are closed upon a heat demand completes a series circuit from the power source through lead 157, opening motor limit switch 142, the opening motor 150, through lead 162 to the opposite side of the power source. The opening motor 150 continues to drive the valve in the opening direction until either the thermostat 154 indicates a satisfaction of heat and contacts 156 and 158 open, or the valve opening limit switch 142 is opened.

A circuit is also completed from power source lead 157 through a series circuit with closing motor limit switch 144, the closing motor 152, and lead 162 to the opposite side of the power source. Thus the closing motor 152 is always energized when the closing motor limit switch 144 is closed to always attempt to drive the shaft and the associated cam and valve plate members to decrease the flow opening. When the opening phase of the valve is stopped, either by the thermostat or the opening limit switch 142, as previously mentioned, the completed circuit through the closing motor 152 reverses the shaft and its associated parts to decrease the valve setting. If the opening phase is terminated by the opening of limit switch 142 while still having a continued call for heat through thermostat 154 any pulsing of the shaft is of negligible concern. This is true since the speed of the shaft rotation is too slow, approximately 1 r.p.h.; and since the opening limit switch 142 is engaged only upon a 100% heat demand of the valve, a condition which rarely occurs. However, it would be obvious by means of more elaborated circuitry including relays or the like that the closing motor 152 in the extreme full open position could be directly dependent on the thermostat to prevent any pulsing.

The subject modulating gas valve is positioned in a gas flow series circuit with the conventional gas system components such as the pressure regulator, and the manual and/or automatic shut-off valves. It is desirable to position the subject modulating gas valve downstream of the pressure regulator so as to be subjected to a constant inlet gas pressure. Where the pressure regulator and automatic gas valve are combined, as is commonly the case, the subject modulating gas valve would be placed between the regulator valve and the burner downstream of the regulator valve.

It is thus noted that the gas flow through the subject valve is regulated by controlled passageway areas defined between the inlet 12 and the outlet 14. The flow areas are regulated manually by the secondary by-pass plug 98, and automatically by modulating the cam contours 26 over the aligned slots 58 and 72 and/or by means of the alignable openings 64 and 58. It is readily apparent that a valve could be designed having various percentages of the previously-mentioned controls to affect the desired minimum, mean, and maximum gas flow outputs of the valve.

Thus a valve having minimum and maximum flow settings that meet American Gas Association standards for various output burners could still have accurate flow modulation between the extremes. A minimum flow setting corresponding to, for example, 20% or 30% capacity would provide for minimum burner operation without flame starvation while also maintaining adequate burner efficiency. Accurate minimum settings are readily possible by means of the by-pass bore 94 and the adjustable plug 98. For heat outputs less than the minimum, control is achieved in the conventional on-off method. A fine modulation per degree of shaft rotation between the minimum setting and 80% or 90% maximum capacity is possible, while thereafter rapidly increasing the flow output to maximum. The cam contour 26 cooperating with the aligned slots 56 and 72 provides the modulation, while the alignable openings 58 and 64 in the valve seat and valve plate greatly increase the flow rate per degree revolution of the shaft 24. Modulation is possible in any uniform or non-uniform manner desired, simply by varying the cam contours. Also, by varying the spacing, shaping, and/or sizing of the various openings wide ranges of gas flows are possible for a given inlet gas pressure.

It has also been found that to minimize temperature overshoot and undershoot the time required to modulate the control valve from the minimum setting to the maximum setting should be about 45 to 50 minutes. With such a slow acting valve, the thermostat should cycle approximately 5 to 8 times per hour. Thus each cycle operates approximately only 10 minutes so that the maximum variation of the heat output from the theoretically needed uniform heat output varies only a few percent. Under balanced conditions, the portion of the modulating cycle where the valve output is increasing is equal timewise to the portion of the modulating cycle where the valve output is decreasing.

The subject control structurally is composed of relatively simple elements which can be economically fabricated at a minimum of cost. A conventional casting forms the valve body having a minimum of finished surfaces and calibrated openings. Similarly, the valve plate and cam member can be of economical stampings or the like contoured as required. The electrical control through the opposing motors, the sample thermostatic control, and the cam actuated limit switches eliminates electronic components or relays to minimize the cost while still ensuring dependable operation. Since the subject modulating valve is not a substitute for any particular component in conventional gas systems, but is an additional component independent of the others, it is readily adapted to existing systems. Also, since the valve adjustment members frictionally engage each other and the valve body, and are positioned by positive acting means, the valve operates effectively at any and all angular positions. Similarly, the valve setting, when made, is independent of the gas inlet pressure.

While a particular embodiment of the subject modulating gas valve has been disclosed, it will be obvious to those skilled in the art that various modifications could be made without departing from the inventive concept of the disclosure. It is thus desired that the invention be limited solely by the limitations of the following claims.

What is claimed is:

1. In a gas appliance, a modulating gas valve comprising a valve body having an internal cavity and having an inlet and an outlet, wall structure in the valve body separating the internal cavity into two chambers and having at least one communicating through-opening defining an internal passageway between the chambers, means including a movable member cooperating in the operative positions thereof with the wall structure to cover in varying degrees the through-opening operable to vary the effective gas flow opening of the internal passageway, and means to actuate the movable member to modulate the gas volume input to the gas appliance, said actuating means including two synchronous motors of different output torques at the same operating speed adapted to oppose each other in one phase of the operating cycle so that the higher output motor overcomes the smaller motor to actuate the movable member in one direction, and adapted in the other phase of the operating cycle to have the smaller motor unopposed to actuate the movable member in the opposite direction.

2. In a gas applicance, a modulating gas valve comprising a valve body having an internal cavity and having an inlet and an outlet, wall structure separating the internal cavity into two chambers communicating, respectively, with the inlet and outlet, said wall structure having thereon a valve seat having at least two communicating through-openings between the chambers, a valve plate cooperating with the valve seat and having at least two openings adapted in various operative positions thereof to define with the valve seat openings, respectively, a continuous internal passageway and an opened-closed internal passageway between the chambers, means including a cam member cooperating with the valve plate to cover in varying degrees the continuously provided passageway to vary the effective flow opening thereof, and means to actuate the cam member and the valve plate in a predetermined manner to modulate the passageway openings for affecting various gas volume inputs to the gas appliance.

3. In a gas appliance, a modulating gas valve comprising a valve body having an internal cavity and having an inlet and an outlet, wall structure separating the internal cavity into two chambers, respectively, communicating with the inlet and outlet, said wall structure having at least two communicating through-openings therein between the chambers, means slidably cooperating with the wall structure and having at least one opening adapted in various operative positions thereof to be communicated with one of the wall structure openings to define an opened-closed flow path between the chambers, means having a cam contour adapted in various operative positions thereof to cover in varying degrees the other of the wall structure openings to define a variable area flow path between the chambers, and means to actuate the slidable and cam contour means between the operative positions to modulate between maximum and minimum values the gas volume inputs to the gas appliance.

4. In a gas appliance, a modulating gas valve comprising a valve body having an internal cavity and having an inlet and an outlet, wall structure separating the internal cavity into two chambers, respectively, communicating with the inlet and outlet, said wall structure having at least two communicating through-openings therein between the chambers, covering means slidably cooperating with the wall structure and having at least one opening adapted in various operative positions thereof to be aligned with one of the wall structure openings to define an opened-closed flow path between the chambers, covering means having a cam contour adapted in various operative positions thereof to cover in varying degrees the other of the wall structure openings to define a variable area flow path between the chambers, and means including a reversible motor to actuate the covering means between the operative positions in a predetermined manner to modulate gas volume inputs to the gas appliance.

5. A modulating gas valve, comprising a hollow valve body having an inlet and outlet, wall structure defining within the valve body separate chambers communicating, respectively, with the inlet and outlet, said wall structure including a valve seat generally symmetrical about the longitudinal center axis thereof and having a first through-opening therein spaced radially from the center axis and having at least one other through-opening spaced therefrom, a drive shaft rotatably supported by the valve body in line with and coincidentally of said center axis, means complementarily seated on the valve seat generally covering the through-openings therein and guided by said drive shaft for slidable rotational movement thereon, said covering means being adapted to define with said valve seat openings at least one continuously defined through-passageway and at least one opened-closed through-passageway between the chambers, spring means between the valve body and the covering means operable normally to maintain the openings therein associated with the opened-closed through-passageway in a closed non-aligned relationship, means having a cam contour adapted in the various operative positions thereof to traverse and cover in varying degrees at least the through-opening of the continuously provided through-passageway, and means to drive the drive shaft and in turn the covering means in a predetermined manner to vary progressively the effective flow cross-section of the through-passageways.

6. A modulating gas valve, comprising a hollow valve body having an inlet and outlet, wall structure defining within the valve body separate chambers communicating, respectively, with the inlet and outlet, said wall structure including a valve seat generally symmetrical about the longitudinal center axis thereof, said valve seat having a first through-opening therein spaced radially from the center axis and having at least one other through-opening spaced therefrom, a drive shaft rotatably supported by the valve body in line with and coincidentally of said center axis and projecting exteriorly from the valve body sealingly thereof, a valve plate complementarily seated on the valve seat generally covering the through-openings therein and guided by said drive shaft for slidable rotational movement thereon, said valve plate having a generally similar number of circumferentially and radially spaced through-openings as said first and other through-openings adapted to define therewith at least one continuously defined through-passageway and at least one opened-closed through-passageway between the chambers, spring means between the valve body and the valve plate operable normally to maintain the openings therein associated with the opened-closed through-passageway in a closed non-aligned relationship, a cam member complementarily seated on the valve plate and guided by the drive shaft for slidable rotatable movement thereon, said cam member having a cam contour adapted in the various operative positions thereof to traverse and cover in varying degrees at least the through-opening of the valve plate associated with the continuously provided through-passageway, and means to drive the projected end of the drive shaft and in turn the cam member and valve plate in a predetermined manner to vary progressively upon shaft rotation the effective flow cross-section of the through-passageways.

7. A modulating gas valve, comprising a hollow valve body having an inlet and outlet, wall structure defining within the valve body separate chambers communicating, respectively, with the inlet and outlet, said wall structure including a valve seat general symmetrical about the longitudinal center axis thereof and having a first through-opening therein spaced radially from the center axis, a drive shaft rotatably supported by the valve body in line with and coincidentally of said center axis, covering means guided by said drive shaft for rotational movement relative to the valve seat, said covering means having an edge contour adapted in the various operative positions thereof to traverse and cover in varying degrees the through-opening, means to drive the drive shaft and in turn the covering means to vary progressively upon shaft rotation the effective flow cross-section of the through-opening, said wall structure further having a second through-opening therein spaced from the covering means, and means including a plug member having a seat complementary to the second through-opening actuated independently of the covering means operable to define an adjustable by-pass passageway between the chambers for initial minimum flow settings.

8. A modulating gas valve, comprising a hollow valve body having an inlet and outlet, wall structure defining within the valve body separate chambers communicating, respectively, with the inlet and outlet, said wall structure including a valve seat generally symmetrical about the longitudinal center axis thereof, said valve seat having a first through-opening therein spaced radially from the center axis and having at least one other through-opening spaced therefrom, a drive shaft rotatably supported by the valve body in line with and coincidentally of said center axis, a valve plate complementarily seated on the valve seat generally covering the through-openings therein and guided by said drive shaft for slidable rotational movement thereon, said valve plate having a generally similar number of circumferentially and radially spaced through openings as said valve seat and adapted to define therewith at least one continuously defined through-passageway and at least one opened-closed through-passageway between the chambers, spring means between the valve body and the valve plate operable normally to maintain the openings therein associated with the opened-closed through-passageway in a closed non-aligned relationship, a cam member complementarily seated on the valve plate and guided by the drive shaft for slidable rotatable movement thereon, said cam member having a cam contour adapted in the various operative positions thereof to traverse and cover in varying degrees at least the through-opening of the valve plate associated with the continuously provided through-passageway, and means to drive the drive shaft and in turn the cam member and valve plate to vary progressively upon shaft rotation the effective flow cross-section of the through-passageways, said drive means permitting initial relative sliding movement of the cam member on the valve plate for fully traversing the cam contour past the valve plate opening from minimum to maximum effective opening, and thereafter joining the cam member and valve plate in common movement relative to the valve seat for fully opening the normally closed opened-closed through-passageway.

9. The gas valve according to claim 8 wherein limit switch means are disposed in spaced adjacent relationship to the drive shaft, and wherein means connected to the drive shaft in driving association therewith actuate the limit switch means to control the drive means at the positions thereof corresponding to the maximum and minimum flow values.

10. The gas valve according to claim 8, wherein said drive means includes two synchronous motors of different output torques at the same operating speed adapted to oppose each other in one phase of the operating cycle so that the higher output motor overcomes the smaller output motor to actuate the cam member and if appropriate the valve plate in one rotatable direction, and adapted in the other phase of the operating cycle to have the smaller motor unopposed to actuate the cam member and if appropriate the valve plate in the opposite direction.

11. A modulating gas valve, comprising a hollow valve body having an inlet and outlet, wall structure defining within the valve body separate chambers communicating, respectively, with the inlet and outlet, said wall structure including a valve seat generally symmetrical about the longitudinal center axis thereof, said valve seat having a first through-opening therein spaced radially from the center axis and having at least one other through-opening spaced therefrom, a drive shaft rotatably supported by the valve body in line with and coincidentally of said center axis and projecting exteriorly from the valve body sealingly thereof, a valve plate complementarily seated on the valve seat generally covering the through-openings therein and guided by said drive shaft for slidable rotational movement thereon, said valve plate having a generally similar number of circumferentially and radially spaced through-openings as said first and other through-openings adapted to define therewith at least one continuously defined through-passageway and at least one opened-closed through-passageway between the chambers, spring means between the valve body and the valve plate operable normally to maintain the openings therein associated with the opened-closed through-passageway in a closed non-aligned relationship, a cam member complementarily seated on the valve plate and guided by the drive shaft for slidable rotatable movement thereon, said cam member having a cam contour adapted in the various operative positions thereof to traverse and cover in varying degrees at least the through-opening of the valve plate associated with the continuously provided through-passageway, means to drive the projected end of the drive shaft and in turn the cam member and valve plate in a predetermined manner to vary progressively upon shaft rotation the effective flow cross-section of the through-passageways, said drive means including two synchronous motors of different output torques adapted to oppose each other in one phase of the operating cycle so that the higher output motor overcomes the smaller output motor to actuate the cam member and if oppropriate the valve plate in one rotatable direction, and adapted in the other phase of the operating cycle to have the smaller motor unopposed to actuate the cam member and if appropriate the valve plate in the opposite direction, and limit switch means disposed in adjacent spaced relationship to the drive shaft operable to be actuated thereby at the positions corresponding to the maximum and minimum flow values of the valve to reverse the operating cycle.

12. A modulating gas valve, comprising a hollow valve body having an inlet and outlet, wall structure defining within the valve body separate chambers communicating, respectively, with the inlet and outlet, said wall structure including a valve seat generally symmetrical about the longitudinal center axis thereof, said valve seat having a first through-opening therein spaced radially from the center axis and having at least one other through-opening spaced therefrom, a valve plate complementarily seated on the valve seat generally covering the through-openings therein and guided for slidable rotational movement thereon, said valve plate having a generally similar number of circumferentially and radially spaced through-openings as said first and other through-openings adapted to define therewith at least one continuously defined through-passageway and at least one opened-closed through-passageway between the chambers, spring means between the valve body and the valve plate operable normally to maintain the openings therein associated with the opened-closed through-passageway in a closed non-aligned relationship, a cam member complementarily seated on the valve plate and guided for slidable rotatable movement thereon, said cam member having a cam contour adapted in the various operative positions thereof to traverse and cover in varying degrees at least the through-opening of the valve plate associated with the continuously provided through-passageway, and means to drive the cam member and valve plate in a predetermined manner to vary progressively the effective cross-section of the through-passageways.

13. A modulating gas valve, comprising a hollow valve body having an inlet and outlet, wall structure defining within the valve body separate chambers communicating, respectively, with the inlet and outlet, said wall structure including a valve seat generally symmetrical about the longitudinal center axis thereof, said valve seat having a first through-opening therein spaced radially from the center axis and having at least one other through-opening spaced therefrom, a valve plate complementarily seated on the valve seat generally covering the through-openings therein and guided for slidable rotational movement thereon, said valve plate having a generally similar number of circumferentially and radially spaced through openings as said valve seat and adapted to define therewith at least one continuously defined through-passageway and at least one opened-closed through-passageway between the chambers, spring means between the valve body and the valve plate operable normally to maintain the openings therein associated with the opened-closed through-passageway in a closed non-aligned relationship, a cam member complementarily seated on the valve plate and guided for slidable rotatable movement thereon, said cam member having a cam contour adapted in the various operative positions thereof to traverse and cover in varying degrees at least the through-opening of the valve plate associated with the continuously provided through-passageway, and means to drive the cam member and valve plate to vary progressively the effective cross-section of the through-passageways, said drive means permitting initial relative sliding movement of the cam member on the valve plate for fully traversing the cam contour past the valve plate opening from minimum to maximum effective opening, and thereafter joining the cam member and valve plate in common movement relative to the valve seat for fully opening the normally closed opened-closed through-passageway.

14. The gas valve according to claim 13, wherein limit switch means are disposed in spaced adjacent relationship to one another, and wherein the drive means actuates the limit switch means at positions of the valve plate and cam members corresponding to the maximum and minimum flow values.

15. A modulating gas valve, comprising a hollow valve body having an inlet and outlet, wall structure across the valve body between the inlet and outlet and having a valve seat thereon generally symmetrical about a given axis therethrough, said valve seat having a first through-opening therein spaced radially from the given axis and having at least one other through-opening spaced therefrom, a valve plate complementarily seated on the valve seat generally covering the through-openings therein and guided for slidable rotational movement thereon, said valve plate having a generally similar number of spaced through-openings as said valve seat adapted to define therewith at least one continuously defined through-passageway and at least one opened-closed through-passageway, spring means between the valve body and the valve plate operable normally to maintain the openings therein associated with the opened-closed through-passageway in a closed non-aligned relationship, a cam member complementarily seated on the valve plate and guided for slidable rotatable movement thereon, said cam member having a cam contour adapted in the various operative positions thereof to traverse and cover in varying degrees at least the through-opening of the valve plate associated with the continuously provided through-passageway, and means to drive the cam member and valve plate in a predetermined manner to vary progressively the effective cross-section of the through-passageways.

16. A modulating gas valve, comprising a hollow valve body having an inlet and outlet, wall structure across the valve body between the inlet and outlet and having a valve seat thereon generally symmetrical about a given axis therethrough, said valve seat having a first through-opening therein spaced radially from the axis and having at least one other through-opening spaced therefrom, a valve plate complementarily seated on the valve seat generally covering the through-openings therein and guided for slidable rotational movement thereon, said valve plate having a generally similar number of spaced through-openings as said valve seat adapted to define therewith at least one continuously defined through-passageway and at least one opened-closed through-passageway, a cam member complementarily seated on the valve plate and guided for slidable rotatable movement thereon, said cam member having a cam contour adapted in the various operative positions thereof to traverse and cover in varying degrees at least the through-opening of the valve plate associated with the continuously provided through-passageway, and means to drive the cam member and valve plate in a predetermined manner to vary progressively the effective cross-section of the through-passageways.

References Cited by the Examiner

UNITED STATES PATENTS

| | | | |
|---|---|---|---|
| 1,356,568 | 10/20 | Stevens | 158—119 |
| 1,711,660 | 5/29 | Stephenson. | |
| 2,083,532 | 6/37 | Kronmiller | 236—78 X |
| 2,141,614 | 12/38 | Mott | 236—99 |
| 2,285,204 | 6/42 | Hall et al. | 236—74 X |
| 2,377,497 | 6/45 | Hopkins | 158—119 X |
| 2,761,331 | 9/56 | Buescher | 251—134 X |
| 2,797,706 | 7/57 | Harrison | 251—133 X |
| 3,008,641 | 11/61 | Hopkins. | |

EDWARD J. MICHAEL, *Primary Examiner.*

ALDEN D. STEWART, *Examiner.*